United States Patent [19]

Suzuki et al.

[11] Patent Number: 5,137,785

[45] Date of Patent: Aug. 11, 1992

[54] COMPOSITE MATERIAL AND PROCESS FOR PREPARATION THEREOF

[75] Inventors: Shoji Suzuki, Yokohama; Tokio Kaneki, Hachioji; Masayoshi Matsui, Yamato; Motoyuki Yamato, Kanagawa, all of Japan

[73] Assignee: Nippon Zeon Co., Ltd., Tokyo, Japan

[21] Appl. No.: 325,824

[22] Filed: Mar. 20, 1989

[30] Foreign Application Priority Data

Mar. 29, 1988 [JP] Japan .................. 63-73183
Jul. 11, 1988 [JP] Japan ................. 63-171038

[51] Int. Cl.$^5$ ............................................. B32B 25/08
[52] U.S. Cl. .................. 428/411.1; 428/516; 428/517; 428/519
[58] Field of Search ............... 428/516, 519, 411.1, 428/517

[56] References Cited

U.S. PATENT DOCUMENTS

| 4,111,349 | 9/1978 | Buckler et al. | 428/517 |
| 4,136,247 | 1/1979 | Tenney et al. | 526/283 |
| 4,136,248 | 1/1979 | Tenney | 526/283 |
| 4,136,249 | 1/1979 | Tenney et al. | 526/283 |
| 4,178,424 | 12/1979 | Tenney et al. | 526/283 |
| 4,923,678 | 5/1990 | Benedikt et al. | 428/411.1 |
| 4,923,734 | 5/1990 | Benedikt | 428/411.1 |

FOREIGN PATENT DOCUMENTS 0102933 9/1978 Japan ................ 428/520

Primary Examiner—Ellis P. Robinson
Assistant Examiner—Archene Turner
Attorney, Agent, or Firm—Thoburn T. Dunlap; George A. Kap

[57] ABSTRACT

The invention herein is directed to article and process for making it. The article is characterized by a substrate composed of a ring-opened polymer of a norbornene-type monomer having tricyclic or higher cyclic structure and a polymer sheet tenaciously adhering to the substrate. The process includes the steps of positioning the polymer sheet in a mold, flowing the monomer in a liquid state in a plurality of streams into the mold, polymerizing the monomer in the mold by ring-opening of the monomer, and removing the article from the mold with the polymer sheet on at least one outer surface thereof.

10 Claims, No Drawings

COMPOSITE MATERIAL AND PROCESS FOR PREPARATION THEREOF

BACKGROUND OF INVENTION

A plastic sandwiched board comprising a core of a foamed or unfoamed plastic material and surface layers of a metal or a rigid plastic material such as a glass fiber-reinforced plastic material, laminated on the core, is widely used as a light-weight composite material having excellent rigidity and impact resistance for the production of a car body, a construction panel, a top structure of a ship and the like. These plastic sandwiched boards have heretofore been prepared according to a method comprising heat-pressing surface layers to a pre-formed plastic core by using an adhesive. Accordingly, the productivity was low.

As means for solving this defect, there has been proposed a method in which a reaction liquid containing a monomer having a norbornene unit and a metathesis catalyst is cast between spaced surface layers and polymerized according to the reaction injection molding technique to obtain a plastic sandwiched board (see Japanese Unexamined Patent Publication No. 62-122718). According to this method, a plastic sandwiched board can be manufactured more easily than by the conventional method, and light-weight composite material having excellent mechanical properties can be obtained. However, in this method, since metal sheet or a rigid plastic sheet is used, the adhesion to the polymer of the core is insufficient, and it is difficult to color the surface layers the desirable color or freely control the thickness of the surface layers, or to laminate the surface layers in the state registered with the shape of the core when the shape of the core is complicated. The rigid plastic sheet can be in the form of a sheet of plastic material such as epoxy resin, phenolic resin or an unsaturated polyester reinforced with glass or carbon fibers.

A molded article obtained by bulk-polymerizing a norbornene monomer such as dicyclopentadiene (DCP) by the reaction injection molding (RIM) method is generally colored yellow or brown, and even if a pigment is incorporated, the color tends to change with the lapse of time. Even if it is intended to improve or modify the surface state of the molded body by laminating a colored or printed plastic sheet, a composite material having sufficient utility is difficult to obtain because most of these colored or printed plastic sheets have poor adhesion to the bulk-polymerized product of a norbornene monomer.

Furthermore, in molding a norbornene monomer according to the RIM method or the like, the unreacted monomer is often left in the molded article, and hence, a peculiar smell is generated and use of the molded article is thus restricted.

OBJECTS

It is an object of the present invention to provide a composite material comprising a substrate of a ring-opened polymer of a norbornene monomer and a plastic layer having good adhesion to the substrate in absence of any adhesive therebetween, which is formed on the surface of the substrate.

Another object of the present invention is to provide a composite material which is a molded article formed of a ring-opened polymer of a norbornene monomer, in which the surface layer can be optionally colored and the surface quality can be selected.

Still another object of the present invention is to obtain a composite material having a reduced smell from the ring-opened polymer of a norbornene monomer.

SUMMARY OF INVENTION

This invention pertains to an article composed of a substrate and a surface layer wherein the substrate is a ring-opened polymer of a norbornene-type monomer having tricyclic or higher cyclic structure and said surface layer is a polymer sheet of an olefin polymer or a thermoplastic hydrocarbon elastomer. The polymer sheet tenaciously adheres to the substrate without any extraneous adhesive or means to a degree that tearing takes place in the substrate when an attempt is made to separate the polymer sheet from the substrate. This invention also pertains to the process of making the article by positioning the polymer sheet within a mold, flowing into the mold a liquid monomer charge containing the norbornene-type monomer, polymerizing the monomer by ring-opening to produce an article wherein at least one outer surface thereof is defined by the polymer sheet tenaciously adhering to the substrate. The monomer charge can be introduced into the mold in a plurality of separate streams, one of which contains metathesis catalyst component, one of which contains a metathesis cocatalyst component, and one of which contains a halogen source.

DETAILED DESCRIPTION OF INVENTION

We researched this subject with a view to solving the above-mentioned problems of the conventional techniques and as a result, it was found that by forming a layer of an olefin polymer and/or a thermoplastic hydrocarbon elastomer on at least one surface of a substrate composed of a ring-opened polymer of a norbornene polymer having a tricyclic or higher cyclic structure, there can be obtained a composite material having excellent interface adhesion, in which the surface layer can be colored with the weatherability improved, and formation of sink marks or blisters or generation of smell is reduced.

In accordance with the present invention, there is provided a composite material comprising (A) a substrate composed of a ring-opened polymer of a norbornene monomer having a tricyclic or higher cyclic structure and (B) a layer of an olefin polymer and/or a thermoplastic hydrocarbon elastomer formed on at least one surface of the substrate (A).

Furthermore, in accordance with the present invention, there is provided a process for the preparation of a composite material which comprises supplying a starting reaction liquid comprising a norbornene having a tricyclic or higher cyclic structure and metathesis catalyst to a mold in which material or forming a layer of an olefin polymer and/or a thermoplastic hydrocarbon elastomer is arranged, and carrying out ring-opening bulk polymerization in the mold.

The monomer used as the starting material for the ring-opened polymer of the substrate (A) in the present invention is a polycyclic norbornene monomer having a tricyclic or higher cyclic structure. Since the norbornene monomer having a tricyclic or higher cyclic structure is used, a polymer having a high heat distortion temperature is obtained, and a higher heat resistance required for a composite material can be attained.

In the present invention, if desired, the formed polymer may be of the thermosetting type. For this purpose, a crosslinking monomer is used in an amount of at least 10% by weight, preferably at least 30% by weight, based on the total monomers.

As the norbornene monomer having a tricyclic or higher cyclic norbornene monomer, there can be mentioned tricyclic monomers such as dicyclopentadiene and dihydro-dicyclopentadiene, tetracyclic monomers such as tetracyclododecene, pentacyclic monomers such as trimers of cyclopentadiene, hexacyclic monomers such as hexacycloheptadecene, heptacyclic monomers such as tetramers of cyclopentadiene, $C_1$ to $C_6$ alkyl substitution products thereof such as methyl, ethyl, propyl and butyl substitution products, $C_2$ to $C_6$ alkylidene substitution products thereof such as ethylidene, propylidene, and butylidene substitution products, and $C_6$ to $C_{21}$ aryl substitution products thereof such as phenyl, tolyl and naphthyl substitution products.

In view of the availability, reactivity and heat resistance, use of tricyclic, tetracyclic or pentacyclic monomers is recommended.

The crosslinking monomer is selected from polycyclic norbornene monomers having at least two reactive double bonds. For example, there can be mentioned dicyclopentadiene, tricyclopentadiene and tetracyclopentadiene. Accordingly, where the norbornene monomer is the same as the crosslinking monomers, any other crosslinking monomer need not particularly be used.

These norbornene monomers can be used singly or in the form of a mixture of two or more of them.

The norbornene monomers having tricyclic or higher cyclic structures can be obtained by heat-treating dicyclopentadiene. As the heat treatment method, there can be mentioned a method in which dicyclopentadiene is heated at a temperature of 120° to 250° C. in an inert gas atmosphere for 0.5 to 20 hours. By this heat treatment, a monomer mixture comprising pentacyclopentadecadiene, namely, a cyclopentadiene trimer, and unreacted dicyclopentadiene, is obtained.

In the present invention, a bicyclic norbornene monomer that can be polymerized by ring-opening, such as 2-norbornene, 5-methyl-2-norbornene or 5-phenylnorbornene, or a monocyclic cycloolefin such as cyclobutene, cyclopentene, cyclopentadiene, cyclooctene or cyclododecene can be used together with at least one of the above-mentioned norbornene monomers having a tricyclic or higher cyclic structure, as long as attainment of the objects of the present invention are not impeded.

In the present invention, any of known metathesis catalyst systems can be used without any limitation for the bulk polymerization of the norbornene monomer. Examples of such catalysts are disclosed in Japanese Unexamined Patent Publications No. 58-127728, 58-129013, 59-51911, 60-79035, 60-186511 and 61-12615. As the metathesis catalyst, there can be mentioned halides, oxyhalides, oxides and organic ammonium salts of tungsten, molybdenum and tantalum. Such catalysts especially include molybdenum and tungsten compounds, and more specifically, organoammonium molybdates and tungstates which are soluble in the norbornene-type monomers and which are insensitive to air and moisture.

Alkylaluminum halides, alkoxyalkylaluminum halides, aryloxyalkylaluminum halides and organic tin compounds can be used as the activator or cocatalyst. The cocatalylsts especially include cocatalysts selected from alkylaluminum and alkylaluminum halide compounds, alkoxyaluminum and alkoxyaluminum halide compounds, and alkylmetals, especially alkyltin hydrides.

The metathesis catalyst is used in an amount of about 0.01 to about 50 millimoles, preferably 0.,1 to 10 millimoles, per mole of the norbornene monomer. The cocatalyst is used at a molar ratio of from 0.1 to 200, preferably from 2 to 10, to the catalyst component.

Preferably, both of the metathesis catalyst and the cocatalyst are used in the state dissolved in the monomer. However, the catalyst and the cocatalyst can be used in the state suspended or dissolved in a small amount of a solvent, as long as the properties of the product are not substantially degraded.

The composite material of the present invention has a structure in which a polymer layer (B) of an olefin polymer and/or a thermoplastic hydrocarbon elastomer is formed on at least one surface (A) of a substrate composed of a ring-opened polymer of a norbornene monomer having a tricyclic or higher cyclic structure.

As the olefin polymer, there can be mentioned, for example, high density polyethylene, medium density polyethylene, low density polyethylene, ethylene/propylene copolymer, ethylene/butene-1 copolymer, polypropylene (PP), polybutene-1, polypentene-1, ethylene/propylene rubber (EPR), poly-4-methylpentene-1, polystyrene, and ethylene/propylene/diene terpolymer (EPDM). These olefin polymers may be used either alone or in combination.

The elastomers among the above-listed olefin polymers are used in the form of a crosslinked polymer or partially crosslinked polymer.

Among the above-listed olefin polymers, the plastic materials are superior to the crosslinked elastomers in adhesion to the substrate. However, a mixture of an appropriate amount of a partially crosslinked elastomer such as EPR or EPDM and an appropriate amount of a plastic material, such as polyethylene or polypropylene, has properties of a thermoplastic elastomer and is advantageous in that the resulting layer has good adhesion similar to the plastic material and properties of the thermoplastic elastomer.

As specific examples of the thermoplastic hydrocarbon elastomers, there can be included block copolymers having units derived from a vinyl aromatic compound such as styrene (S) and units derived from a conjugated diene such as isoprene (I) or butadiene (B). More specifically, the thermoplastic hydrocarbon elastomers include, for example, S-I type, S-B type, S-I-S type, S-B-S type, S-I-S-I-S type, and hydrogenation products thereof. These thermoplastic hydrocarbon elastomers may be used either alone or in combination. These thermoplastic hydrocarbon elastomers may be used in the form of a mixture with any desired amount of the olefin polymers.

The olefin polymers and the thermoplastic hydrocarbon elastomers have good adhesion to the substrate. In contrast, other polymers for example, polyvinyl chloride (PVC), polyvinylidene chloride (PVDC) or polyethylene terephthalate (PET) have poor adhesion to the substrate, and thus a composite material having a practical utility cannot be obtained therefrom.

A film, sheet or plate having a desired thickness can be used as the polymer layer (B). Furthermore, a film or sheet processed to have a specific shape by vacuum forming may be arranged in a mold described hereinafter. If a colored sheet of desired color, a printed sheet, or a sheet patterned by embossing or the like is used, a composite material having desired surface characteristics can be obtained. If a transparent sheet or film is used as the surface layer, a composite material retaining the color of the substrate can be obtained.

The substrate used in the present invention is a ring-opened polymer obtained by ring-opening bulk polymerization of a norbornene monomer having a tricyclic or higher cyclic structure. Substantial bulk polymerization is sufficient and the presence of a small amount of an inert solvent is permissible.

According to a preferred embodiment of the process for the preparation of a ring-opened polymer, the norbornene monomer is divided into two liquid portions, they are charged into two different vessels, the metathesis catalyst is added to one liquid while the activator is added to the other liquid, to prepare two stable reaction solutions. The two reaction solutions are mixed, the mixture is cast in a mold having a predetermined shape and ring-opening bulk polymerization is carried out.

In the present invention, a known impingement mixing apparatus customarily used as the RIM molding apparatus can be used for mixing the two starting reaction liquids. In this case, vessels containing the two reaction liquids, respectively, act as different stream supply sources. The two streams are instantaneously mixed at a mixing head of the RIM machine, the mixture is cast in a mold maintained at a high temperature, and bulk polymerization is instantaneously effected.

Where the pot life at room temperature is 1 hour or longer, there may be adopted a method in which the two reaction liquids are mixed in a mixer and then, the mixture is injected or cast in a pre-heated mold once or divided a plurality of times (see, for example, Japanese Unexamined Patent Publication No. 59-51911 and U.S. Pat. No. 4,426,502). In such a case, the size of the mixing apparatus can be diminished as compared with the size of the impingement mixing apparatus, and the operation can be performed under a low pressure.

The process of the present invention is not limited to the embodiment where the two reaction liquids are used. As is easily understood by persons with ordinary skill in the art, there can be adopted various modifications, for example, a modification in which the reaction liquid and an additive are charged into a third vessel and the mixture is used as a third stream.

The mold temperature is generally at least 30° C., preferably 40° to 200° C., and more preferably 50° to 130° C. The mold pressure is usually from 0.1 to 100 kg/cm$^2$.

The polymerization time is appropriately selected. Generally, the polymerization time is shorter than 20 minutes, and preferably, the polymerization time is shorter than 5 minutes.

Preferably, components to be used for the polymerization reaction are stored in an atmosphere of an inert gas such as nitrogen gas and the operation is carried out in this inert gas atmosphere. The mold may be or may not be sealed with an inert gas.

The characteristics of the composite material of the present invention can be modified by incorporation of various additives such as a filler, reinforcing material, foaming agent, pigment, colorant, elastomer and a dicyclopentadiene type heat-polymerized resin. The additives may be incorporated in one or both of the starting reaction liquids or charged to the cavity of the mold. As the filler, there can be used inorganic fillers such as glass, carbon black, talc, calcium carbonate and mica, and as the reinforcing material, there can be mentioned glass fibers and carbon fibers.

When the substrate is foamed, a foaming agent is added to the reaction liquid and the reaction liquid is cast in the mold. A foaming agent which is normally liquid is preferred. For example, there can be mentioned low boiling organic compounds, e.g., hydrocarbons such as pentane and hexane, and halogenated hydrocarbons such as methylene chloride, trichlorofluoromethane and dichlorofluoromethane, and inert gases such as nitrogen and argon.

As the elastomer, there can be mentioned natural rubbers, polybutadiene, polyisoprene, a styrene/butadiene copolymer, a styrene/butadiene/styrene block copolymer, a styrene/isoprene/styrene block copolymer, anethylene/propylene/diene terpolymer, an ethylene/vinyl acetate copolymer, and hydrogenation products thereof.

In the process for the preparation of a composite material according to the present invention, the surface layer-forming material is arranged on the upper part or lower part or both of the mold, the starting reaction liquid containing the norbornene monomer and the metathesis catalyst is supplied into the mold, and ring-opening bulk polymerization is carried out. Arrangement of the surface layer-forming material in the mold is accomplished by placing the material on the lower part of the mold, gripping the material between the upper and lower parts of the mold, lightly holding the material on one surface of the mold by both a surface-adhesive tape or by other appropriate method.

A mold may be formed of a metal or resin, or a frame mold can be used. Where the surface layer-forming material is a thin film, use of a metal mold is preferred, but if a resin mold is used, a product having a good smooth surface is difficult to obtain.

By following the invention described herein, good surface quality or characteristics can be obtained in a filled or reinforced composite. This can be done by placing a polymeric facing sheet in a mold, flowing the liquid monomer charge in a single or a plurality of streams into the mold around the filler and/or reinforcing materials, polymerizing the monomer charge by means of a metathesis catalyst and cocatalyst in the monomer charge to form a polymeric object, and extracting from the mold the object having improved surface characteristics.

If the surface layer-forming material is processed by vacuum forming or the like according to the shape of the mold, that is, the shape of the substrate, even a composite material having a complicated shape can be easily obtained.

Where the substrate has a plate-like shape, the surface layer can be formed on one or both of the surfaces of the plate. If the layer of the olefin polymer is formed on both surfaces of the substrate, the effect of preventing generation of a smell is enhanced. The surface layer can be formed on all or a part of the substrate according to the shape or use of the substrate.

In the ring-opening polymerization of the norbornene monomer in the mold, a sink mark or a dent formed on the surface of the molded article is very often formed on the surface of the molded article, but if the surface layer-forming material is arranged in the mold, the layer-forming material adheres closely to the surface of the substrate with curing and shrinkage of the polymeric material by ring-opening polymerization, and hence, formation of a sink mark by shrinkage is prevented.

In the composite material of the present invention, the layer (B) of the olefin polymer and/or the thermoplastic hydrocarbon elastomer is tightly bonded to the substrate (A) composed of the ring-opened polymer of the norbornene monomer having a tricyclic or higher cyclic structure, formation of a sink mark does not occur and the surface quality is very good.

The polymer for the layer (B) can be easily colored, printed or patterned, and a film, a sheet, a plate or the like can be optionally selected for the surface layer-forming material. Moreover, since the olefin polymer generally has excellent weatherability, the selection range of the surface quality is broad, and a composite material having a desired surface and excellent weatherability can be obtained. In the present invention, the polymer layer (B) is generally used as the outermost surface layer, but a coating layer of other resin or the like may be formed on the olefin polymer layer according to the intended use.

In the composite material of the present invention, since the ring-opened polymer of the norbornene monomer having a tricyclic structure or higher cyclic structure is used as the substrate, the mechanical strength and heat resistance are highly improved. Moreover, since the water-absorbing property of the substrate is low, the dimensional stability is good. Furthermore, the specific gravity of the substrate is about 1.1 or lower and the substrate is very light when compared to the weight of other plastics. Still further, since the reactive injection molding method is adopted, a molded article of a large size can be easily obtained.

By combining physical properties of the substrate with the physical properties of the layer of the olefin polymer and/or the thermoplastic hydrocarbon elastomer polymer, the composite material of the present invention exhibits excellent physical properties.

The present invention will now be described in detail with reference to the following examples and comparative examples. The scope of the invention is not to be limited by these examples. In the examples, all amounts are by weight unless otherwise indicated.

EXAMPLE 1

Dicyclopentadiene (DCPD) containing 2% of a phenol type antioxidant (Irqanox 259 supplied by Ciba-Geigy) was charged to two vessels. To one vessel, diethylaluminum chloride (DEAC), n-propanol and silicon tetrachloride were added at concentrations of 33 mM, 42.9 mM and 20 mM, respectively, based on the weight of DCPD. To the other vessel, tri(tridecyl)ammonium molybdate was added at a concentration of 4 mM, based on the weight of DCPD.

Both reaction liquids were mixed at a mixing ratio of 1/1, and the mixture was cast in a mold measuring 20 cm×20 cm×0.4 cm, which was preheated to 80° C. and in which a sheet of polypropylene (Sholex FA-110 supplied by Showa Denko) having a thickness of 1 mm, of red color, was placed on the bottom of a cavity of the mold. After the casting operation, polymerization was carried out for about 3 minutes to obtain a plate-shaped composite material having a thickness of about 4 mm, which comprised a DCPD polymer substrate and a polypropylene layer. The foregoing operations were conducted in a nitrogen atmosphere.

In the so-obtained composite material, discoloration of the polypropylene layer was not observed, the adhesion between the substrate and the polypropylene sheet was good, no sink marks were formed, and the surface quality was very good. When it was tried to peel the polypropylene sheet from the composite material, fracture was not caused in the interface between the polypropylene sheet and the substrate but the substrate itself was torn in the process.

EXAMPLES 2 and 3 and COMPARATIVE EXAMPLES 1 and 2

Composite materials were prepared in the same manner as described in Example 1 except that a sheet of polyethylene (Sholex 108FS supplied by Showa Denko) was used in Example 2, a sheet of crosslinked ethylene-propylene-diene terpolymer (EPT4021 supplied by Mitsui Petrochemical) was used in Example 3, a sheet of polyvinyl chloride (103EP supplied by Nippon Zeon) was used in Comparative Example 1, and a sheet of Polyethylene terephthalate (NEH2050 supplied by Unitica) was used in Comparative Example 2. Each sheet had a thickness of 1 mm, was colored red, and was used instead of the polypropylene sheet of Example 1.

In the composite materials comprising the polyethylene sheet or crosslinked EPDM sheet as the surface layer, the adhesion was excellent as in the composite material having the polypropylene sheet, no sink marks were formed, and the surface quality was very good. On the other hand, in the composite materials comprising the PVC sheet or the PET sheet as the surface layer, the adhesion between the substrate and the surface layer was poor and peeling easily occurred in the interface between the surface layer and the substrate.

EXAMPLE 4

A plate-shaped composite material having a thickness of 4 mm was prepared in the same manner as described in Example 1 except that a different film of polypropylene (Sholex Allomer A supplied by Showa Denko) which had a thickness of 0.1 mm and was colored blue, was used as the surface layer-forming material. The film was arranged in the mold and a mat of glass fibers having a diameter of 11 μm and an average length of 25 mm was set as the reinforcing material on the film so that the amount of the mat was 50% based on the weight of the entire substrate. The DCPD was then flowed into the mold and polymerized in situ.

Irregular surface of the film did not occur at the molding step and the adhesion between the film layer and the substrate was very good in the resulting composite material.

EXAMPLE 5

A plate-shaped composite material was prepared in the same manner as described in Example 1 except that a transparent polypropylene sheet having a thickness of 1 mm was used. In the resulting composite material, the yellow color of the substrate could be seen through the transparent sheet, and the composite material had an attractive appearance.

EXAMPLE 6 and COMPARATIVE EXAMPLE 3

Plate-shaped composite materials were prepared in the same manner as described in Example 4 except that a transparent polyethylene film (supplied by Tokyo Cellophane) was used in Example 6 and a polyvinylidene chloride (PVDC) film (supplied by Kureha Chemical) was used in Comparative Example 3 as the surface layer forming materials.

In the plate-shaped composite material formed by using the polyethylene film, the adhesion between the film layer and the substrate layer was very good and the composite material had an attractive appearance. In contrast, in the composite material of Comparative Example 3 formed by using the PVDC film, the film layer had no adhesiveness to the substrate and the film layer was easily peeled from the substrate layer.

EXAMPLE 7

A composite material having a thickness of about 4 mm and comprising a polypropylene sheet layer on each of opposing large surfaces was prepared in the same manner as described in Example 1 except, additionally a red sheet of polypropylene having a thickness of 1 mm was arranged at an interval of 2 mm from the bottom sheet. Since this composite material had the polypropylene sheet layer on each face surface, the appearance was beautiful and the smell generated from the substrate layer was drastically reduced.

EXAMPLES 8 and 9

Composite materials were prepared in the same manner as described in Example 1 except that a sheet of partially crosslinked thermoplastic olefin elastomer (Mirastomer 8030N supplied by Mitsui Petrochemical) was used in Example 8 and a sheet of thermoplastic styrene-isoprene-styrene block copolymer elastomer (Quintac 3421 supplied by Nippon Zeon) was used in Example 9, eaching having a thickness of 1 mm and being of red color, instead of the polypropylene sheet.

The composite materials had excellent adhesion as in the composite material having the polypropylene sheet, no sink marks were formed, and the surface was soft.

According to the present invention, a ring-opened polymer of a norbornene monomer having a tricyclic or higher cyclic structure is used as the substrate and a layer of an olefin polymer and/or a thermoplastic hydrocarbon elastomer is formed on at least one surface of the substrate. The result is a composite material in which the interface adhesion is good, the surface layer can be pigmented, the weatherability is improved, sink marks are not formed, and the smell is reduced. This composite material can be widely used in automobile parts, in electronic equipment parts, in construction material parts, and the like.

What is claimed is:

1. A molded article comprising a ring-opened polynorbornene substrate and a surface layer on at least one side of said substrate, said surface layer adhering to said substrate without the aid of any extraneous adhesive, said substrate is derived from at least one norbornene monomer having a tricyclic or higher cyclic structure, and said surface layer is derived from a polymer substrate selected from the group consisting of olefinic polymers, thermoplastic hydrocarbon elastomers, and combinations thereof in the form of a sheet or plate, and wherein said norbornene monomer is bulk polymerized in a mold in contact with a surface of said polymer substrate.

2. The article of claim 1 wherein at least one of said surface layers is pigmented.

3. The article of claim 1 wherein said norbornene monomer is selected from the group consisting of tricyclic monomers, tetracyclic monomers, pentacyclic monomers, hexacyclic monomers, heptacyclic monomers, and mixtures thereof.

4. The article of claim 3 wherein said norbornene monomer also includes $C_1$ to $C_6$ alkyl substitution products of said monomer, $C_2$ to $C_6$ alkylidene substitution products of said monomer, $C_6$ to $C_{21}$ aryl substitution products of said monomer, and mixtures thereof.

5. Article of claim 4 wherein said $C_1$ to $C_6$ alkyl substitution products contain an alkyl group selected from the group consisting of methyl, ethyl, propyl, butyl, and mixtures thereof; said $C_2$ to $C_6$ alkylidene substitution products contain an alkylidene group selected from the group consisting of ethylidene, propylidene, butylidene, and mixture thereof; and said $C_6$ to $C_{21}$ aryl substitution products contain an aryl group selected from the group consisting of phenyl, tolyl, naphthyl, and mixtures thereof.

6. The article of claim 5 wherein said olefin polymers of said surface layer are selected from the group consisting of high, low, and medium density polyethylenes; ethylene/propylene copolymers; ethylene/butene-1 copolymers; polypropylene; polybutene-1, polypentene-1; ethylene/propylene rubbers; poly-4-methylpentene-1; polystyrene; ethylene/propylene/diene terpolymers; and mixtures thereof.

7. The article of claim 5 wherein said thermoplastic hydrocarbon elastomers of said surface layer are selected from the group consisting of styrene-isoprene polymers, styrene-butadiene polymers, styrene-isoprene-styrene polymers, styrene-butadiene-styrene polymers, styrene-isoprene-styrene-isoprene polymers, hydrogenation products of such elastomer polymers, and mixtures thereof.

8. The article of claim 1 wherein said norbornene polymer is selected from the group consisting of dicyclopentadiene, methyltetracyclododecene, trimers of cyclopentadiene, and mixtures thereof, and said surface layer polymer is selected from polyethylene, polypropylene, ethylene/propylene/diene, partially crosslinked thermoplastic olefin elastomer, styrene-isoprene-styrene block copolymer elastomer, and mixtures thereof.

9. The article of claim 8 wherein said substrate also contains polymerized therein an antioxidant.

10. The article of claim 9 wherein said antioxidant is a phenol type antioxidant.

* * * * *